(12) United States Patent
Wurzberger et al.

(10) Patent No.: US 10,527,143 B2
(45) Date of Patent: *Jan. 7, 2020

(54) TRANSMISSION DEVICE AND ELECTRIC DRIVE UNIT COMPRISING AT LEAST ONE ELECTRIC MACHINE AND THE TRANSMISSION DEVICE

(71) Applicant: Schaeffler Technologies AG & Co. KG, Herzogenaurach (DE)

(72) Inventors: Philip Wurzberger, Nürnberg (DE); Thorsten Biermann, Wachenroth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 52 days.

This patent is subject to a terminal disclaimer.

(21) Appl. No.: 15/753,758

(22) PCT Filed: Aug. 26, 2016

(86) PCT No.: PCT/DE2016/200400
§ 371 (c)(1),
(2) Date: Feb. 20, 2018

(87) PCT Pub. No.: WO2017/036477
PCT Pub. Date: Mar. 9, 2017

(65) Prior Publication Data
US 2018/0245676 A1   Aug. 30, 2018

(30) Foreign Application Priority Data

Sep. 4, 2015   (DE) .................. 10 2015 216 975

(51) Int. Cl.
*F16H 37/08* (2006.01)
*B60K 1/00* (2006.01)
(Continued)

(52) U.S. Cl.
CPC ............. *F16H 37/082* (2013.01); *B60K 1/00* (2013.01); *B60K 17/16* (2013.01); *F16H 1/28* (2013.01);
(Continued)

(58) Field of Classification Search
None
See application file for complete search history.

(56) References Cited

U.S. PATENT DOCUMENTS

| 6,981,478 B2 * | 1/2006 | Schafer ................. F01L 1/022 123/90.17 |
| 2016/0223073 A1 * | 8/2016 | Deitmers .................. F16D 3/18 |
| 2018/0238431 A1 * | 8/2018 | Wurzberger ............. B60K 1/00 |

FOREIGN PATENT DOCUMENTS

| DE | 102005012616 A1 | 10/2005 |
| DE | 102004058572 A1 | 6/2006 |

(Continued)

*Primary Examiner* — Justin Holmes
(74) *Attorney, Agent, or Firm* — Reid A. Baldwin

(57) ABSTRACT

Transmission devices are disclosed having a first planetary drive, a second planetary drive, a hollow shaft, and a shaft which is seated concentrically in the hollow shaft and can be rotated relative to the hollow shaft. In one example, the first planetary drive includes a first sun gear and first planet gears in mesh with the first sun gear, and the second planetary drive has second planet gears in mesh with a second sun gear. The first planet gears and second planet gears may be spaced apart radially from a rotational axis common to the hollow shaft and the shaft, and a shaft section of the shaft may protrude axially from one end of the hollow shaft. In this arrangement, the first sun gear is seated on the shaft section. The second sun gear may be seated on the hollow shaft coaxially with the first sun gear. The first sun gear may carry a seal that rests sealingly on a rotationally symmetrical section of the hollow shaft, which is configured to be rotated relative to the first sun gear about the rotational axis.

8 Claims, 3 Drawing Sheets

(51) Int. Cl.
*B60K 17/16* (2006.01)
*F16H 1/28* (2006.01)
*F16H 48/10* (2012.01)
*F16H 57/029* (2012.01)

(52) U.S. Cl.
CPC ........... *F16H 48/10* (2013.01); *F16H 57/029* (2013.01); *B60K 2001/001* (2013.01); *F16H 2048/106* (2013.01)

(56) References Cited

FOREIGN PATENT DOCUMENTS

| | | |
|---|---|---|
| EP | 0632565 A1 | 1/1995 |
| EP | 2711589 A1 | 3/2014 |
| JP | 2000310296 A | 11/2000 |
| JP | 2002235832 A | 8/2002 |

\* cited by examiner

TRANSMISSION DEVICE AND ELECTRIC DRIVE UNIT COMPRISING AT LEAST ONE ELECTRIC MACHINE AND THE TRANSMISSION DEVICE

CROSS-REFERENCE TO RELATED APPLICATIONS

This application is the U.S. National Phase of PCT Appln. No. PCT/DE2016/200400 filed Aug. 26, 2016, which claims priority to DE 102015216975.8 filed Sep. 4, 2015, the entire disclosures of which are incorporated by reference herein.

TECHNICAL FIELD

A transmission device, which has at least one first planetary drive, a second planetary drive, a hollow shaft, and a shaft which is seated concentrically in the hollow shaft and can be rotated relative to the hollow shaft.

BACKGROUND

A transmission device of this kind is described in JP2002235832A as a component part of an electric drive unit. The electric drive unit has a rotor shaft, which is the input shaft of a transmission device. The transmission device is formed from a differential gear unit and a reduction stage. The reduction stage is a planetary drive, the sun gear of which is seated on the rotor shaft. The differential is a "spur gear differential", in which the differential gears are planet gears and the output gears are sun gears. Each sun gear is seated on an output shaft of the differential. The torques input via the input shaft/rotor shaft are introduced into the differential via the reduction stage and are distributed by the differential to the output shafts and hence to driven vehicle wheels. The rotor shaft is a hollow shaft, through which one of the output shafts is passed. In this arrangement, an annular gap is formed between the rotor shaft and the output shaft. The output shaft and the respective sun gear are connected to one another for conjoint rotation by splines. Apart from wet-rotor electric motors, the region of the electric machine between the stator and the rotor should be kept free of lubricating oil. However, the transmission device is lubricated with transmission oil. There are drive units in which the annular gap between the output shaft and the rotor shaft is used as an oil duct in order, for example, to feed lubricating oil to a rolling bearing situated axially on the outside. However, there are also drive units in which the rolling bearing situated on the outside is lubricated via other paths or has lifetime lubrication.

SUMMARY

It is an object of the disclosure to provide a transmission device which is adequately sealed.

This object may be achieved by the subject matter disclosed in the description and the drawings.

According to the disclosure, it is envisaged that at least one of the sun gears of the planetary drive carries at least one seal, e.g., also forms the seat for a seal installed in a fixed manner in the sun gear. The seal rests sealingly on a surface segment of the hollow shaft, which can be rotated relative to the first sun gear about the rotational axis. The hollow shaft is a transmission shaft or a rotor shaft or an extension or piece for connection to the rotor shaft, for example.

A seal by which an annular gap between a sun gear of a planetary drive and a transmission shaft in a vehicle transmission is to be sealed off is described in DE 10 2005 012 616A1. The seal is formed by a steel sleeve and a bushing. The steel sleeve is press-fitted in a hole in the sun gear. The bushing is inserted radially between the steel sleeve and the transmission shaft. Since the sun gear and the transmission shaft in DE 10 2005 012 616A1 are rotatable relative to one another, small radial clearances must be formed between the steel sleeve, the bushing and the transmission shaft. These clearances define annular gaps via which leaking oil can pass through the seal. Accordingly, this seal is suitable only for systems in which oil flows are supposed to be selectively distributed but in which the regions on both sides of the seal can or should be wetted by the lubricating oil.

Because the seal is accommodated in the output gear, little or no additional installation space is taken up by the seal since the seal can be integrated into existing projections (e.g. into a hub) of the sun gear. As an alternative, it is envisaged that the seal seat is a ring of hollow-cylindrical design. By way of example, one section of the ring is used to seat it firmly on a hub of the sun gear. By such an embodiment of the disclosure, the sun gear can be made simpler, without a seal seat. The hollow-cylindrical ring is a simple component which can be produced at low cost.

For the sake of simplicity, the sun gears of differentials are generally provided with through holes to enable the internal splines to be produced without hindrance. The output shaft is provided with external splines, which correspond to the internal splines of the sun gear. This known splined joint is very easy to assemble and is therefore readily used. With respect to leaking oil, the splined joint between the sun gears of a differential is a weak point of the differential since this is formed with a clearance. Lubricating oil can escape to the outside through the leakage gaps associated with the clearance. The disclosure contributes to preventing leakage oil from escaping via the splined joint, especially if, as one embodiment of the disclosure envisages, the through hole in the sun gear having the seal is closed by a closure element. With such an arrangement, the transmission device is sealed off by the seal relative to the annular gap between the hollow shaft and the output shaft and by the closure element relative to the splined joint. The closure element can be a plug or cover seated in the through hole. As an alternative, a cover with a rim is placed externally on a hub of the sun gear.

The operation of differentials is sufficiently well known to those skilled in the art. Differentials to which the disclosure relates are gear units in which torques applied to at least one input shaft are distributed uniformly or non-uniformly to at least two output shafts via differential gears and, to this end, they are arranged longitudinally, for example, between two driven axles or alternatively between the driven wheels on one axle. The differential gears are gears of conical design or spur gears. The output gears of the transfer gear unit are sun gears with a conical shape or spur gears.

Embodiments of the disclosure also relate to an electric drive unit which has a transmission device with the features according to the disclosure.

In the electric drive units of the type according to the disclosure, the annular gap between the rotor shaft or hollow shaft and the output shaft should remain dry. If the transmission device is not adequately sealed, lubricating oil, for example, can reach the rotor shaft, which heats up during operation, and can there form a resinous or sooty residue. As a consequence, unwanted deposits can form in the annular gap over the long term. With the aid of the arrangement according to the disclosure, it is possible to prevent oil from getting into the annular gap—especially when the seal is a radial shaft seal (a radial shaft sealing ring), as envisaged by one embodiment of the disclosure.

The radial shaft sealing ring has at least one sealing lip, preferably composed of NBR (Nitrile Butadiene Rubber=Nitrile Rubber) or a polymer such as PTFE (polytetrafluoroethylene), and a hollow-cylindrical seat portion, preferably with a metallic reinforcing ring. It is seated firmly in the sun gear or in a ring on the sun gear. The sealing lip runs on the surface segment of the hollow shaft. The contact pressure of the sealing lip is optionally reinforced by an oil seal spring (garter spring). Lubricating oil forms a relatively firm pressurized film on the surface of a rotating joint. Nevertheless, a radial shaft sealing ring makes it possible to retain the lubricating oil reliably in the transmission device at the joint between the hollow shaft and the transmission device and is advantageously suitable especially for use in an electric drive unit.

DETAILED DESCRIPTION

Figure 1:
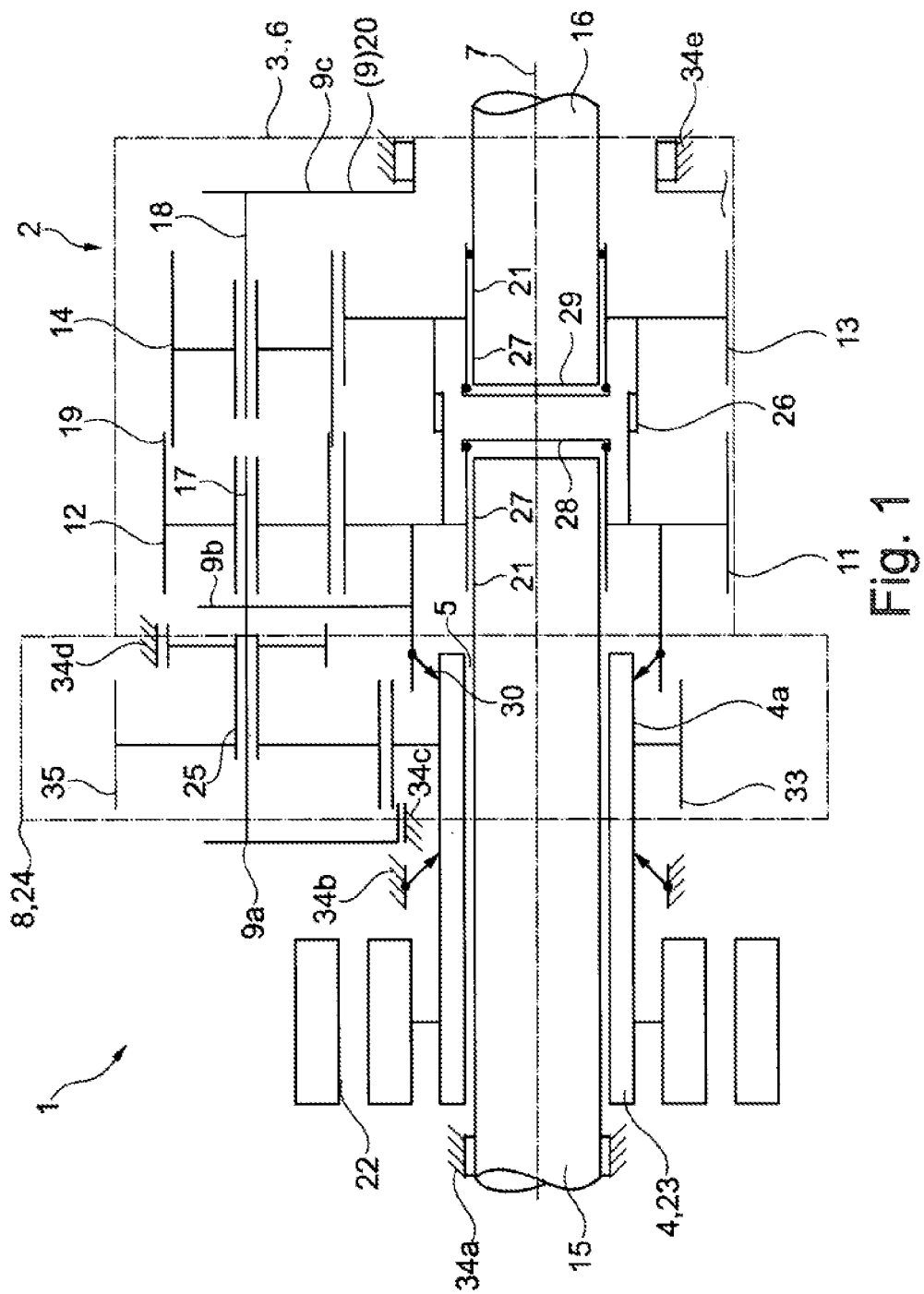
FIG. 1 is a schematic diagram of an electric drive unit, according to an embodiment.

FIG. 1 shows a diagram, not to scale, of an electric drive unit 1, which has a transmission device 2 with an illustrative embodiment of a transfer gear unit 3 embodied as a differential, in a longitudinal section along the central axis 7 of the drive unit. An electric machine 22 is operatively connected to a reduction gear unit 24 of the transmission device 2 by a rotor shaft embodied as a hollow shaft 23. The reduction gear unit 24 is a planetary drive 8. Double planets 25 (consisting of two planet gears connected firmly to one another) form a link between the reduction gear unit 24 and the transfer gear unit 3. The transfer gear unit is a planetary drive 6.

Figure 2:
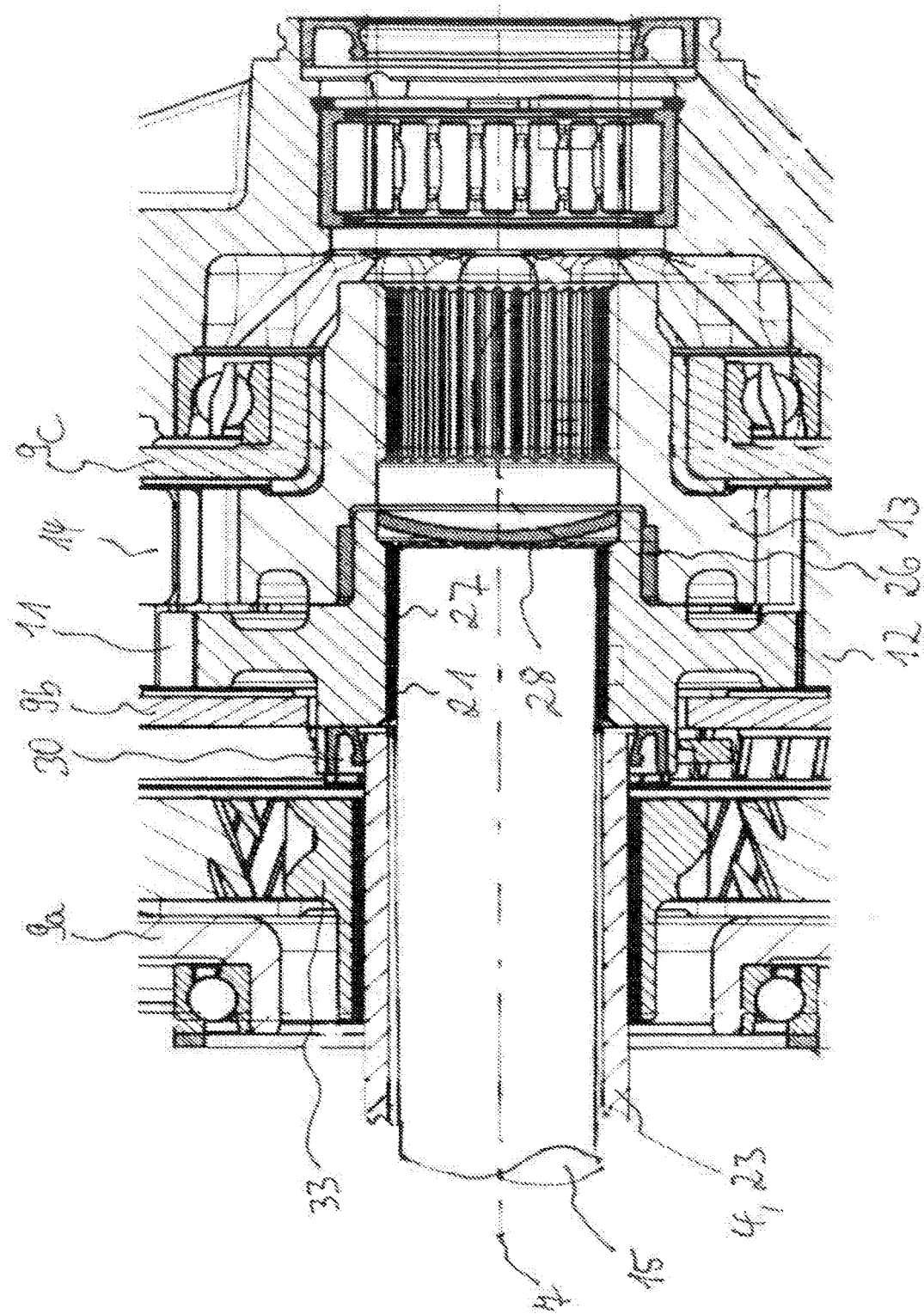
FIG. 2 is a cross-section of an electric drive unit, according to an embodiment.

FIG. 2 shows a concrete illustration of a detail of the drive unit 1 focusing on the connections of the output shafts 15 and 16 of the transfer gear unit 3, in a longitudinal section along the central axis 7 of the drive unit 1.

The transfer gear unit 3 has a differential cage 9 formed by the carrier segments 9a, 9b, 9c, a set of differential gears 12, a set of differential gears 14, two output gears 11 and 13, and two shafts embodied as output shafts 15 and 16. The transfer gear unit 3 is embodied in the manner of a planetary drive as a spur gear differential. Accordingly, the differential cage is a planet carrier 9. The differential gears are planet gears 12 and 14, and the output gears are sun gears 11 and 13.

The output gears 11 and 13 are arranged axially adjacent to one another on a common rotational axis, which is on the central axis 7, and can be rotated relative to one another about the rotational axis. The differential gears 12 and 14 are supported on planet pins 17 and 18, respectively, in such a way as to be rotatable about pin axes. The planet pins 17 and 18 are fixed on the planet carrier 9. The differential gears 12 of the first set of planets are in mesh with output gear 11. The differential gears 14 of the second set of planets mesh with output gear 13. One differential gear 12 in each case is in mesh 19 with one differential gear 14. Moreover, output gears 12 and 14 are supported radially on one another at a bearing location 26.

The planet carrier 9 is the input shaft 20 of the differential and is driven by the double planets 25 of the reduction gear unit 24, which are supported on a ring gear. The planet carrier 9 is mounted in a housing (not shown) in such a way as to be rotatable about the central axis 7, said housing being indicated by housing sections 34a-34e. The first output gear 11 is seated for conjoint rotation on the first output shaft 15 by a splined joint 21, and the second output gear 13 is seated for conjoint rotation on the second output shaft 16 by a further splined joint 21. The output shafts 15 and 16 are situated coaxially with their ends opposite one another, wherein the hollow shaft 23 forms a shaft duct 4 for the first output shaft 15.

The shaft duct 4 or rotor shaft 4 is rotatable about the central axis 7 relative to the input shaft 20 and to the output shafts 15 and 18. Seated on the rotor shaft 4 is a gearwheel 33, which is a sun gear 33 of the reduction gear unit 24 embodied as a planetary drive. The sun gear 33 is a component of a geared operative connection between the rotor shaft 4, embodied as a hollow shaft, and the input shaft 20 of the transfer gear unit 3 and is in mesh with a set of planet gears 35 of the double planets 25.

An annular gap 5 is formed between the shaft duct 4 and output shaft 15. The first output gear 11, that is to say the first sun gear 11 in this case, is provided with a seal 30. The seal 30 rests sealingly on a rotationally symmetrical surface segment 4a of the shaft duct 4. Moreover, the gaps 27 of the respective splined joint 21 between the output shafts 15 and 16 and the respective sun gear 11 and 13 are optionally sealed by a closure element 28 and 29, respectively. As illustrated in FIG. 1, the closure elements 28 and 29 can be sealing caps. The sealing cap is pushed onto the end of the respective output shaft. The end of the sealing cap is situated opposite the end of the output shafts 15 and 16, respectively. Alternatively, the closure elements 28 and 29 are each covers, as illustrated in FIGS. 3 and 4.

Figure 3:
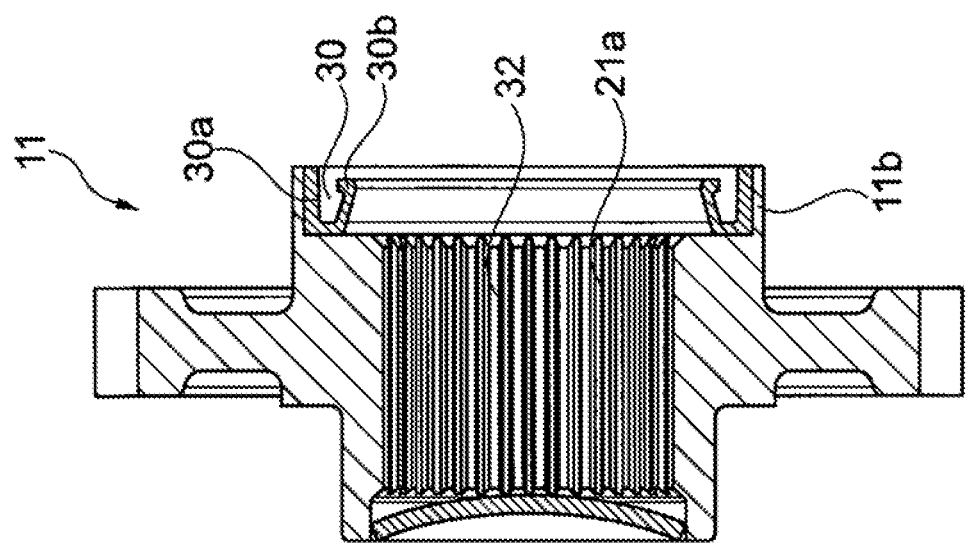
FIG. 3 is a cross-section of a sun gear within the electric drive unit, according to an embodiment.

FIG. 3 shows the first sun gear 11 as an isolated component in a longitudinal section along the rotational axis thereof.

Figure 4:
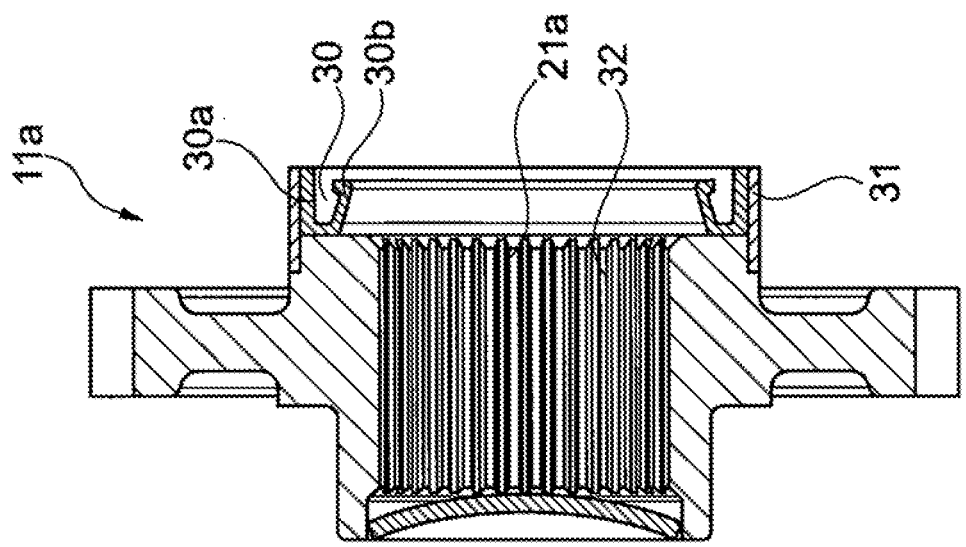
FIG. 4 is a cross-section of another embodiment of a sun gear within the electric drive unit.

FIG. 4 shows another embodiment of a sun gear 11a, which differs from sun gear 11 in having an alternative seal arrangement and which is also illustrated in a longitudinal section.

The sun gears 11 and 11a have a through hole 32, which is provided with internal splines 21a. The seal 30 is a radial shaft sealing ring, which has a hollow-cylindrical seat section 30a and a sealing lip 30b connected thereto by the same material. The seal 30 is seated by the seat section 30a in a hollow-cylindrical projection 11b, which is formed integrally with the sun gear 11 illustrated in FIG. 3. The seal arrangement of the sun gear 11a illustrated in FIG. 4 has a hollow-cylindrical ring 31. The ring 31 is pressed onto the outside of the hub of the sun gear 11a but, as an alternative, can also be press-fitted into a hollow-cylindrical projection of the hub of the sun gear. The seal 30 is seated in the ring 31.

REFERENCE SIGNS 1 drive unit
2 transmission device
3 transfer gear unit/differential
4 shaft duct/rotor shaft
4a rotationally symmetrical section of the shaft duct 5 annular gap
6 planetary drive
7 central axis
8 planetary drive
9 differential cage/planet carrier
9a carrier segment of the planet carrier
9b carrier segment of the planet carrier
9c carrier segment of the planet carrier
10 planet wheel
11 output gear/sun gear
11a sun gear
11b projection of the sun gear
12 differential gear/planet gear
13 output gear/sun gear
14 differential gear/planet gear
15 output shaft
16 output shaft
17 planet pin
18 planet pin
19 mesh
20 input shaft
21 splined joint
21a internal splines
22 electric machine
23 hollow shaft
24 reduction gear unit
25 double planet
26 bearing location
27 gap
28 closure element
29 closure element
30 seal
30a seat section of the seal
30b sealing lip of the seal
31 ring
32 through hole
33 sun gear
34a-34e housing section
35 planet gears of the double planet

The invention claimed is:

1. A transmission device comprising at least one first planetary drive, a second planetary drive, a hollow shaft, and a shaft which is seated concentrically in the hollow shaft and can be rotated relative to the hollow shaft, wherein:
   the first planetary drive is formed at least from a first sun gear and first planet gears in mesh with the first sun gear,
   the second planetary drive has second planet gears in mesh with a second sun gear,
   the first planet gears and second planet gears are spaced apart radially from a rotational axis common to the hollow shaft and the shaft,
   a shaft section of the shaft protrudes axially from one end of the hollow shaft, and, in this arrangement, the first sun gear is seated on the shaft section,
   the second sun gear is seated on the hollow shaft coaxially with the first sun gear,
   and wherein the first sun gear carries a seal and the seal rests sealingly on a rotationally symmetrical section of the hollow shaft, which is configured to be rotated relative to the first sun gear about the rotational axis.

2. The transmission device as claimed in claim 1, wherein the seal is a radial shaft sealing ring having at least one sealing lip resting on a surface segment.

3. The transmission device as claimed in claim 1, wherein the seal is seated in a hollow-cylindrical projection formed integrally with the first sun gear and extending around the rotational axis, wherein the hollow-cylindrical projection projects axially in a direction of the second sun gear.

4. The transmission device as claimed in claim 1, wherein the seal is accommodated in a hollow-cylindrical ring, wherein the ring is at one end on a hub of the first sun gear, concentrically with the rotational axis.

5. The transmission device as claimed in claim 1, wherein the first sun gear has a through hole concentric with the rotational axis, wherein the through hole is closed by a closure element at an end of the first sun gear facing axially away from the second sun gear.

6. An electric drive unit having at least one electric machine and having a transmission device as claimed in claim 1, wherein a rotor of the electric machine is operatively connected to the hollow shaft, and the hollow shaft is an input shaft of the transmission device, and wherein the shaft is an output shaft of the electric drive unit.

7. The electric drive unit as claimed in claim 6, wherein the first planetary drive of the transmission device is a differential, and wherein:
   the differential is formed from:
      a differential cage designed as a planet carrier,
      the first sun gear,
      a third sun gear coaxial with the first sun gear,
      the first planet gears, and
      third planet gears,
   the first sun gear is arranged axially between the third sun gear and the second sun gear,
   the third planet gears are in mesh with the third sun gear,
   the planet gears are supported by the planet carrier in such a way as to be rotatable about planet axes,
   and wherein the second planetary drive is a geared operative connection between the hollow shaft and the differential.

8. The electric drive unit as claimed in claim 7, wherein the first sun gear and the third sun gear have through holes aligned coaxially with one another, and wherein at least the through hole of the first sun gear is closed on one side by a closure element.

* * * * *